United States Patent [19]

Höhn et al.

[11] 4,308,285
[45] Dec. 29, 1981

[54] METHOD OF PRODUCING DRY FLAT BREAD

[76] Inventors: Karl Höhn, Neuköllnische Allee 54, D-1000 Berlin 44; Olaf Höhn, Auguststrasse 16, D-1000 Berlin 45; Wolfgang Höhn, Neuköllnische Allee 54, D-1000 Berlin 44, all of Fed. Rep. of Germany

[21] Appl. No.: 957,354

[22] Filed: Nov. 3, 1978

[30] Foreign Application Priority Data

Nov. 8, 1977 [DE] Fed. Rep. of Germany ....... 2750358

[51] Int. Cl.³ .............................................. A21D 8/00
[52] U.S. Cl. ..................................... 426/18; 426/560; 426/523
[58] Field of Search ...................... 426/18, 19, 62, 64, 426/20

[56] References Cited

U.S. PATENT DOCUMENTS

| T909,005 | 4/1973 | Meisner. | |
|---|---|---|---|
| 2,206,619 | 7/1940 | Schreier | 426/18 |
| 2,322,940 | 6/1943 | Kirby et al. | 426/18 |
| 2,920,964 | 1/1960 | Oakes | 426/19 |

FOREIGN PATENT DOCUMENTS 1442036 10/1970 Fed. Rep. of Germany ........ 426/18

OTHER PUBLICATIONS

Stewart, *Bread and Bread Baking*, Pittman's Common Commodities and Industries, N.Y. 1925, pp. 32-34.
Jago, *The Technology of Bread-Making*, Baker's Helper Co., Chicago, Ill., 1921, pp. 190-191 and 236-239.
Pomeranz et al., *Bread Science and Technology*, Av. Pub. Co. Inc., Conn. 1971, pp. 43, 2 and 3.

*Primary Examiner*—Raymond N. Jones
*Assistant Examiner*—Elizabeth A. Hatcher
*Attorney, Agent, or Firm*—Allison C. Collard; Thomas M. Galgano

[57] ABSTRACT

An arrangement for producing dry flat bread, using flour, water and leaven, biologically fermenting the leaven by mixing flour and water and subsequently cooling mash. The mash is stored for 70 hours. The baking dough is also mixed from flour and water and leaven is added, before further cooling to below 12° C. The dough is baked in baking plate sets. Both leaven and baking dough may be pumped through a pipeline network to successive processing stations. The arrangement comprises leaven and dough storage tanks, a mixing tank, moving containers, remote-controlled valves, a heat exchanger and a cooler, all processing stations controlled from a central control panel.

3 Claims, 1 Drawing Figure

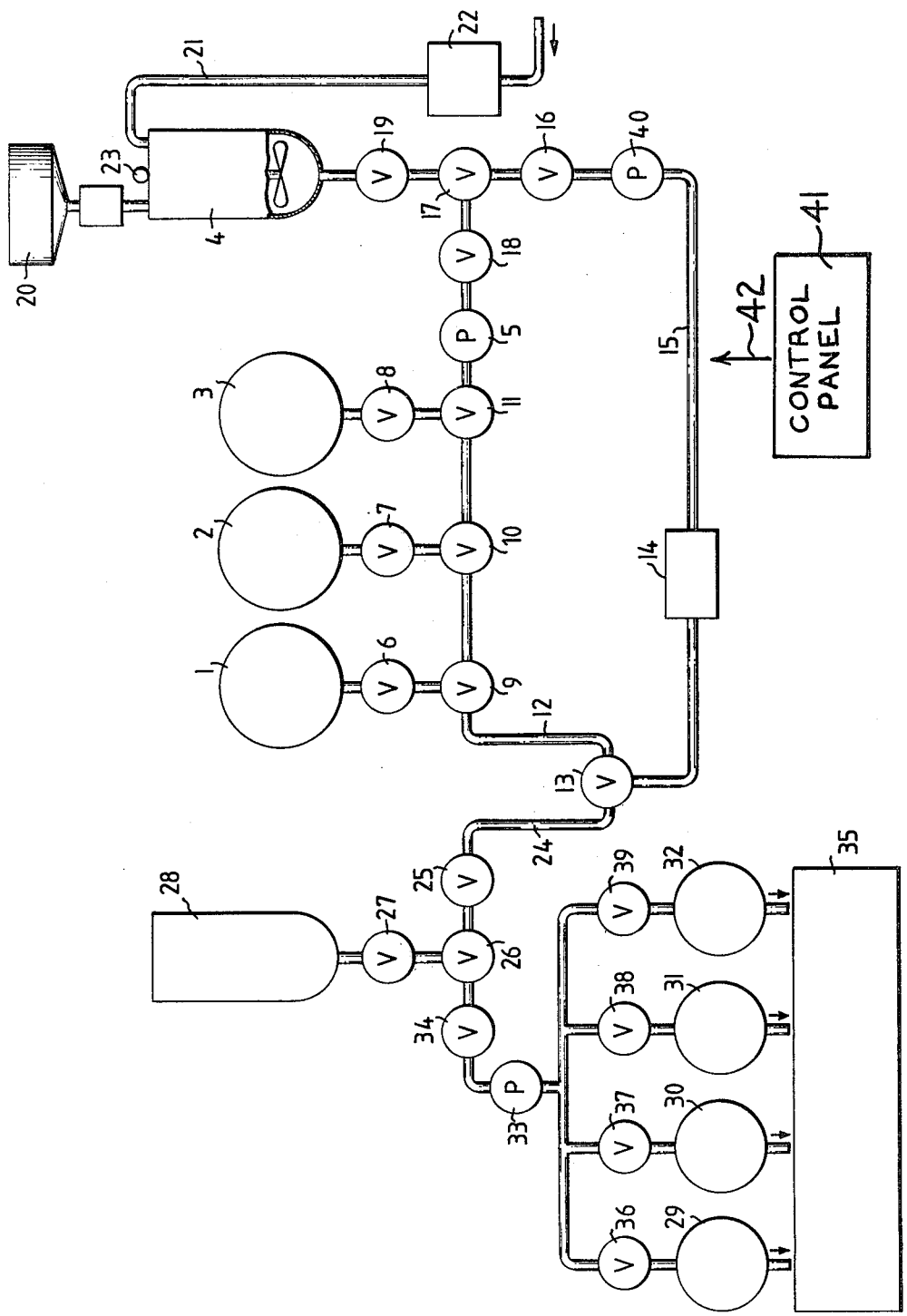

METHOD OF PRODUCING DRY FLAT BREAD

BACKGROUND OF THE INVENTION

The present invention relates to a method for the manufacture of dry flat bread and an apparatus for carrying out this method.

Previously known dry flat breads, for example the rye wafers, always have a solid partially brittle consistency which makes consumption difficult to a large number of consumers, for example to those wearing dental fixtures. Zwieback and biscuits, however, which frequently are easier to masticate, do not come into consideration as bread substitute because of their sweet taste, and are particularly unsuitable as a base for cold cuts, fish, cheese, etc.

Accordingly, it is an object of the present invention to provide a dry flat bread which has the typical taste of bread characterized by its leaven component and is of crunchy easily masticated consistency, so as to constitute a storable baked item.

Another object of the present invention is to provide an arrangement of the foregoing character which is substantially simple in construction and may be economically fabricated.

A further object of the present invention is to provide an installation, as described, which may be readily maintained in service and which has substantially long operating life.

SUMMARY OF THE INVENTION

These objects of the present invention are achieved by a manufacturing method with the follow steps:

(a) Preparation of the leaven by mixing flour and water in a ratio of about 1:8, with the water temperature in the range 75°–95° C. subsequent cooling of the mash to about 35° C. and storing at 20°–50° C. for about 70 hours;

(b) Mixing the baking dough from flour and water in the ratio of 0.8:1 while adding leaven and various ingredients with a proportion below one percent by weight;

(c) Cooling the dough to a temperature below 12° C. and (d) Baking the dough in baking plate sets.

Within the framework of the method according to the present invention, a biologically produced leaven is used for the first time as fermenting agent which is started anew for each batch without "injecting" the dough with a starting quantity of finished leaven. This leaven leads to a pleasant mild bread taste. A further perculiarity of the method in accordance with the present invention is the very high water content of the dough which contributes to the fact that the bread crackers baked in a baking plate set consisting of an upper and a lower plate have a loose crisp consistency even through they are so crumbleproof that they can be covered in the usual fashion with a spread.

Because of the low water content of the bread produced in accordance with the present invention it is virtually permanently storable if stored protected against harmful external influences.

In a further development of the present invention, both leaven and baking dough are delivered by means of pumps via a pipeline network of the successive processing stations. The high water content of the dough is utilized for a type of transport which facilitates fully automatic production.

According to a further inventive concept, an installation for carrying out the above stated method comprises three storage tanks for the biological leaven production, a mixing tank for the baking dough preparation, a storage tank from which the moving containers of the automatic baking oven are supplied, a pipeline network connecting the leaven storage tanks and the mixng tank, the mixing tank and the baking dough storage tank, and the baking dough storage tank and the moving containers with remote-controlled valves and a heat exchanger and a cooler, all processing stations being controlled from a central control panel.

Because three storage tanks are provided, a continuous production over periods of any length is ensured. The capacity of each of these storage tanks is dimensioned so that the leaven quantity prepared therein is sufficient for a full day's production of the installation. If a storage tank immediately after emptying is charged with mash, the leaven can fully develop during the following three days, since another storage tank is available for the production of the next day and the day after.

The described special property of the leaven, the extremely flowable bread dough, and finally the baking of the bread dough between baking plates, similar to the known waffle irons, lead to a novel bread of mild piquant taste, which is very digestible, goes well with cold cuts and spreads of all kinds and can be stored over long periods because of the low fat and water content. Because of its low calorie content the flat bread produced in accordance with the present invention is well suited for diets including reducing diets.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

A schematic view of the installation for carrying out the method of the present invention.

DESCRIPTION OF THE PREFERRED EMBODIMENTS

Leavens are started successively in the three storage tanks 1–3 at intervals of 24 hours, consisting of water and flour under a certain temperature application. The capacity of one storage tank is dimensioned so that the biologically developed leaven quantity produced in it is sufficient for a fully daily production of the plant. Immediately after removing the last leaven portion, a new leaven is started in the storage tank just emptied in the manner described, requiring about three days for fermentation.

Assuming the storage tank 3 for one day's production has been emptied and could be filled with new mash, the leaven of storage tank 1 which had been started three days ago is available for the next day. On the day after the leaven of storage tank 2 is used, and on the third day the leaven of storage tank 3 is ready for use.

As already mentioned, the leaven, after remaining for a short period at a temperature of 75°–95° C. in the mixing tank, must be cooled to about 35° C. For this purpose, when the leaven in storage tank 3 is involved, with throughway valves 6 and 7 of storage tanks 1 and 2 closed, and via "closed" two-way valves 9 and 10 and open two-way valve 11 and through the opened throughway valve 8 leaven is placed in storage tank 3. The pump 4 is turned on and draws the leaven from the mixing tank 4 via the throughway valves 16 and 19 and pushes it through the pipeline 15 and the plate cooler 14 via the multiway valve 13 into the pipeline 12 through the closed two-way valves 9 and 10 and via the two-way valve 11 and the opened throughway valve 8 into the storage tank 3.

In order to initiate the mentioned and desired temperature differences and the proper fermenting processes, the leaven must be pumped in the meantime (within 3 days) several times through proper control of the valves through the tempered plate cooler. The procedure is precisely the same as described in the preceding paragraph.

The bread dough is prepared in mixing tank 4. Via the flour weighing station 20, the flour is pumped into it, and via the pipeline 21 the water cooled beforehand in a plate cooler (not shown). Finally the leaven is added via pump 5. The leaven, which is taken, for example, from storage tank 3, flows through the throughway valve 8 and the two-way valve 11 and valves 18, 17 and 19 into this mixing tank 4 in which the agitator 23 is installed.

After the mixing tank has been loaded, its agitator 23 is turned on and the bread dough is homogenized. After closing throughway valve 18 and opening throughway valve 19 and two-way valve 17 and throughway valve 16 and the plate cooler 14, where it is cooled to the required storage temperature, it is delivered through the properly set multiway valve 13 and pipeline 24 and the opened throughway valve 25, the two-way valve 26 and the throughway valve 27 to storage tank 28 which is thus supplied with the amount required for one day's production.

Then the throughway valve 25 is closed, and the moving containers 29-32 are continually supplied under the delivery pressure of pump 33 after opening throughway valve 34, according to the band feed of automatic baking oven 35 whose baking plate sets (not shown) are intermittently filled with bread dough. The intermittent bread dough delivery is controlled via valves 36-39. All processing stations are operated from a central control panel 41 by outputs 42.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for producing a dry flat bread, comprising the steps of:
    (a) preparing leaven by mixing flour and water in a ratio of substantially 1:8, with the water temperature being in the range of 75°–95° C. to produce a mash;
    (b) subsequently cooling said mash to substantially 35° C. and storing it at 20°–50° C. for substantially 70 hours;
    (c) separately mixing flour and water in a ratio of 0.8:1, for a period of time sufficient to produce a dough;
    (d) adding said leaven to said dough in an amount sufficient to leaven said dough;
    (e) cooling said leavened dough to a temperature below 12° C.; and
    (f) baking said dough between pairs of baking plates to produce a baked product having a crisp loose consistency.

2. A method as defined in claim 1 including the step of conducting both leaven and baking dough by pump means via a pipeline network to successive processing stations.

3. A method as defined in claim 1, wherein said step (a) comprises starting leavens successively in three storage tanks at intervals of 24 hours, wherein said step (b) comprises pumping the leaven a plurality of times through pipe lines with control valves and through a tempered plate cooler, wherein said step (c) comprises pumping the flour from a weighing station into a mixing tank in which the bread dough is to be prepared, cooling water in a plate cooler and introducing the cooled water into said mixing tank, wherein said step (d) comprises pumping leaven from a storage tank into said mixing tank and agitating the mixture therein so that the bread dough is homogenized, wherein said step (e) comprises pumping the contents from the mixing tank after cooling to a storage tank and wherein said step (f) comprises supplying containers with contents from the storage tanks.

* * * * *